United States Patent Office 2,779,190
Patented Jan. 29, 1957

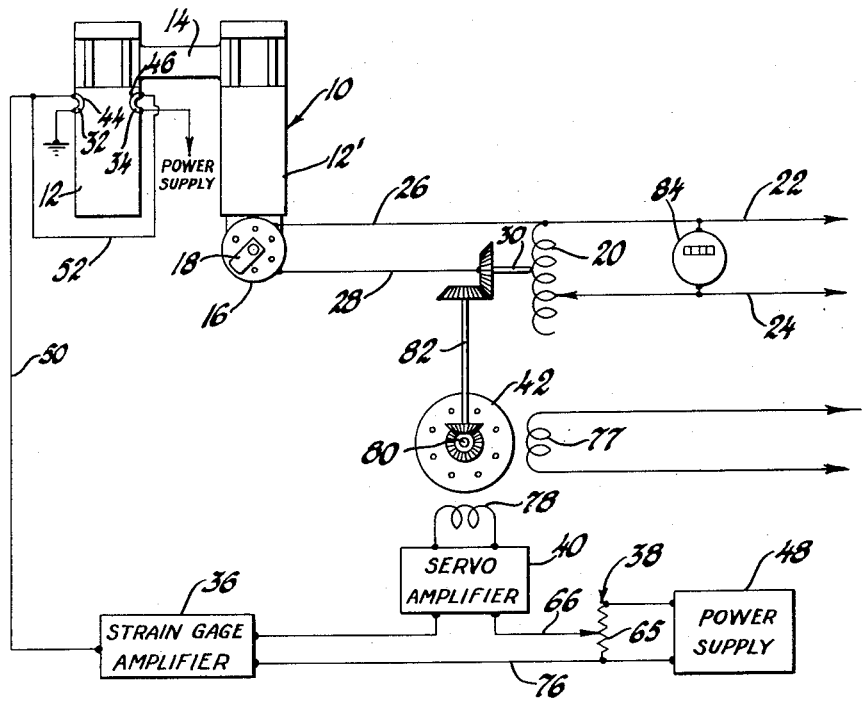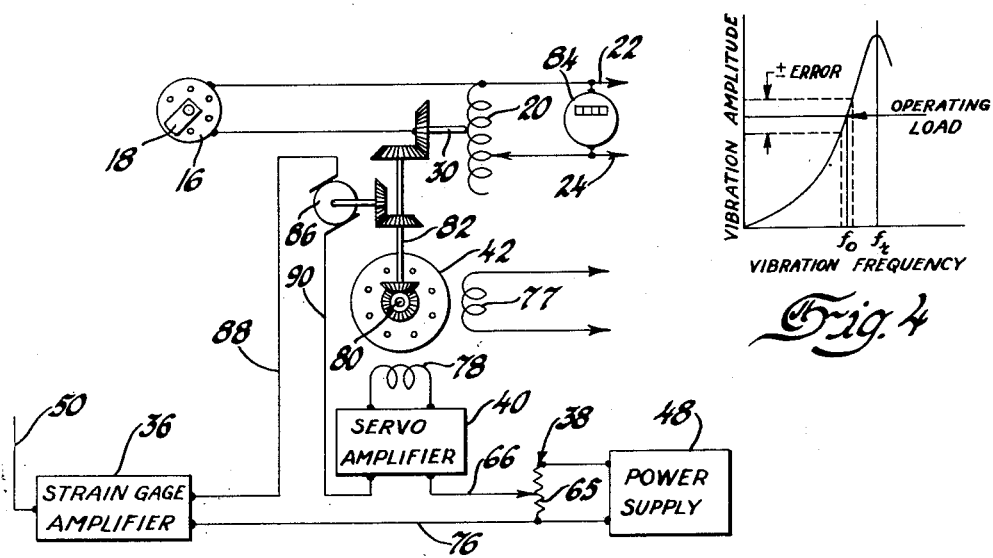

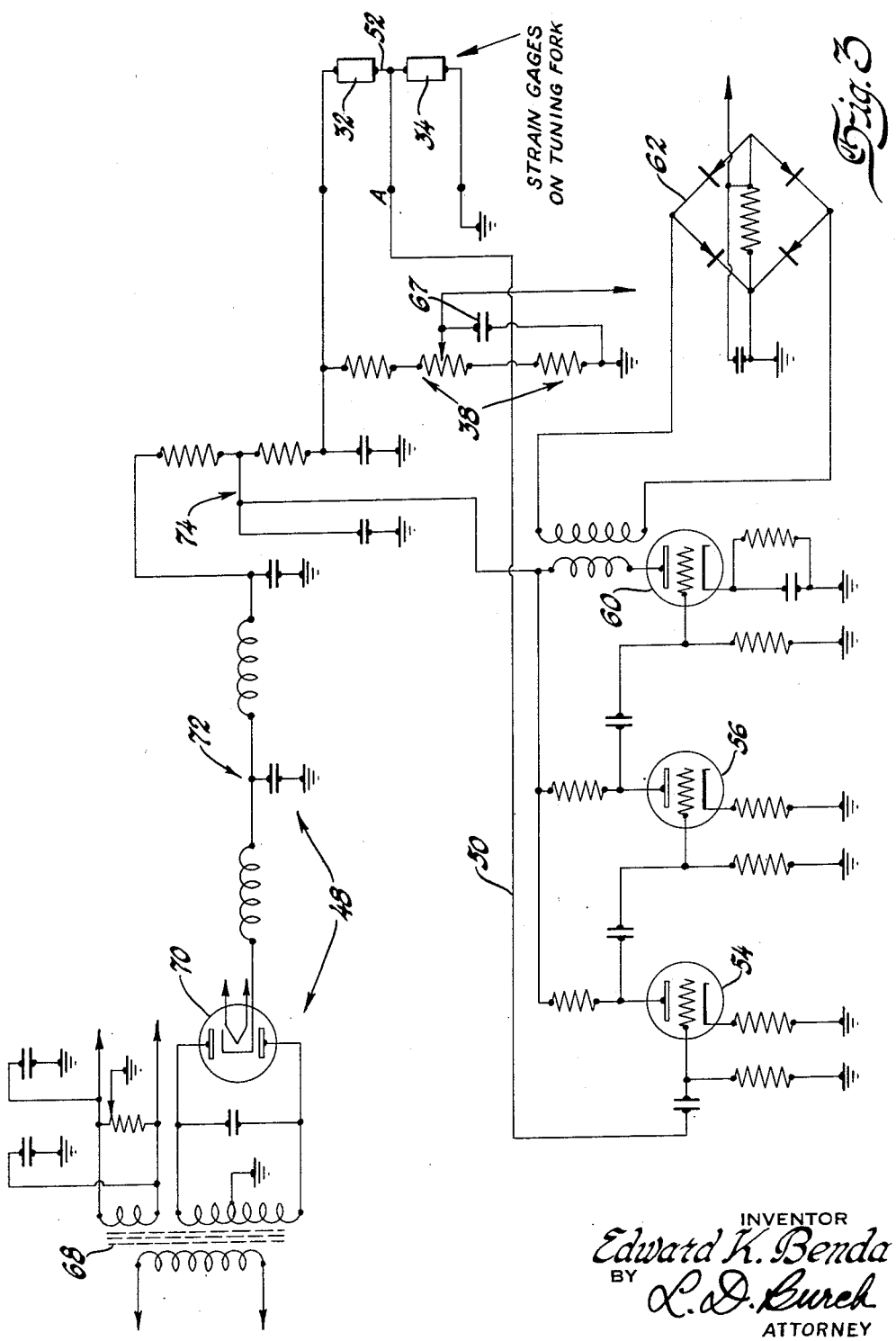

2,779,190
AUTOMATIC LOAD CONTROLLER

Edward K. Benda, Berkley, Mich., assignor to General Motors Corporation, Detroit, Mich., a corporation of Delaware Application December 2, 1953, Serial No. 395,789

6 Claims. (Cl. 73—67.3)

This invention relates to apparatus for automatic load control of material specimen stress testing devices.

The invention is specially suited for use with resonant type fatigue testing machines of the tuning fork variety in which the test specimen is mounted between and forms a coupling member at one of the ends of a pair of spaced parallel elongated bars, forming the arms of the tuning fork. An exciting motor mounted on one of the arms of the fork drives an unbalance weight, which dynamically unbalances the motor, and thereby imparts a harmonically varying exciting force to vibrate the fork.

Testing machines of this type are well known and have been described in the literature. See for example "Full Scale Fatigue Testing of Crankshafts," Gadd and Ochiltree, Society of Experimental Stress Analysis, vol. II, No. II, pages 150–157 (1944).

In apparatus of this character, it has been the practice to use the vibration amplitude of the tuning fork as a basis for comparison of fatigue specimens. In one form of amplitude controller, an on-off contactor type of floating servo system without an equilibrium position has been employed to regulate automatically the speed of the exciting motor and, thereby, the amplitude of vibration.

It has been found, however, that amplitude control may not be an entirely satisfactory basis for comparison of fatigue test specimens in instances where it is desired to run unidirectional or preloaded stress cycles on soft materials and/or where it is desired to run fatigue tests through to complete failure. Where unidirectional stress cycles are run on soft specimens, the initial preload will cause the specimen to yield during the early portion of the fatigue life and thus inject a non-linear factor between the stress in the specimen and the amplitude of vibration. In the second of the aforementioned instances, the appearance of cracks in the specimen late in the fatigue life acts to reduce the load, thereby prolonging the fatigue life.

The above and other deficiencies may be avoided in an automatic controller by using the stress in the specimen rather than the amplitude of vibration of the fork as a primary basis for control. In the case of cracking of the specimen, for example, the stress will be maintained at the same level thus causing quick failure of the remainder of the specimen.

Accordingly, the invention has for its principal objective to provide apparatus for automatically maintaining the load or stress intensity to which the material specimen is subjected substantially constant irrespective of yielding of the specimen or the development of cracks therein.

Another object is to provide a load controller that is operable from a strain gage pickup signal and yet is possessed of sufficient sensitivity and accuracy to provide an adequate control function over the load.

Another object is to provide such control apparatus that is operable from an alternating current source and is possessed of a reasonably constant and closely regulated control characteristic.

Still another object is to provide in apparatus of the class described a proportional load servo controller employing derivative feed-back in the control loop for improving the control response characteristic.

The manner in which the above and other objects of the present invention are accomplished will appear more fully from the following detailed description and drawings wherein:

Fig. 1 is a block diagrammatic showing of the control apparatus of the present invention;

Fig. 2 is a modification of a part of Fig. 1;

Fig. 3 is a schematic electric circuit diagram of a part of the controller apparatus shown in Fig. 1, and;

Fig. 4 is a resonance curve of a tuning fork bending machine of the type employed in Fig. 1.

Referring to the drawings, the resonant type fatigue testing device 10 of Fig. 1 includes a pair of spaced parallel arms 12, 12' between which the load specimen 14 is mounted, substantially as shown. The arms 12, 12' and the load specimen 14 constitute a resonant tuning fork which may be excited by a small motor 16. The exciting motor 16 is carried by and mounted on the free end of one of the fork arms, as 12', and drives a small unbalance weight 18 by means of which a harmonically varying impulse is imparted to force vibration of the system. Where unidirectional stress cycles are to be run, a spring (not shown) may be mounted between the free ends of the fork arms 12, 12' to supply an initial pre-load thereto.

The exciting motor 16 may be of the single phase, squirrel cage rotor variety possessed of a high slip characteristic and is energized from a local source of alternating current through a voltage adjusting device 20, such as a Variac, which is connected to the A. C. power source over conductors 22, 24 and to the exciting motor 16 over conductors 26, 28. The magnitude of the voltage supplied to the exciting motor 16 may be adjusted by changing the position of the variable arm 30 of the voltage adjusting device 20 thereby to effect a change in the speed of the exciting motor.

Fig. 4 depicts the vibration amplitude vs. frequency response characteristic of the resonant type tuning fork device of Fig. 1. The vibration frequency or period is directly related to the speed of the exciting motor which is adjusted to vibrate the fork at a frequency $f_0$ somewhat below the resonant frequency $f_r$ of the vibrating system and in a region of the resonance characteristic where a slight change in the frequency or period of vibration of the tuning fork is accompanied by an appreciable change in vibration amplitude.

The high slip characteristic of the motor enables a sufficient change to be effected in the speed thereof by changing the voltage applied thereto through the Variac so as to obtain an appreciable variation in the vibration amplitude of the tuning fork and, in this manner, affect the magnitude of the axial load impressed upon the test specimen. The controller of the present invention functions to maintain the operating load level of the test specimen substantially constant and to provide a restoring force that will return the system to this established equilibrium position should the load level be in error or depart therefrom.

The proportional load controller of the present invention comprises a pair of pickup devices 32, 34, a signal amplifier 36 therefor, a reference signal controller 38, a servo amplifier 40, and a servomotor 42.

The pickup devices 32, 34 may be commercially available SR–4, C–10 1000 ohm resistance-type strain gages and are mounted in respective ones of a pair of oppositely positioned notches 44, 46, which are appropriately placed in the sides of one of the arms 12 of the tuning fork device 10 so as to provide a high stress concentration, but not affect adversely the resonant operation of the tuning fork. The strain gages are serially connected and are excited with direct current derived from a power supply 48, as shown in the schematic circuit diagram of Fig. 3. The strain gages provide an alternating current signal having a frequency corresponding to that of the tuning fork vibrations and an amplitude representative of the actual stress intensity in the test specimen. This signal, hereinafter called the dynamic level signal, is provided over a conductor 50, which is connected to the conductor 52 between the gages, and is supplied to the input of the strain gage dynamic signal amplifier 36.

The strain gage amplifier 36 illustrated herein contains several resistance coupled voltage amplifier stages, 54, 56 (Fig. 3), the cathode circuits of which are unbypassed to provide current feed-back for stabilizing the amplifier, and one power amplifier stage 60, which is transformer coupled to a full-wave, dry-type balanced detector or rectifier bridge 62 and provides an impedance match to the servo amplifier 40.

The reference signal controller 38 may comprise an adjustable voltage divider 65 connected to the power supply 48 and provides a fixed reference D. C. signal between the adjustable arm 66 and the low potential side thereof. A condenser 67 connected across a part of the voltage divider, as shown in Fig. 3, may be employed to provide additional filtering.

The power supply 48, from which the strain gage amplifier and static signal controller receive their operating voltages, employs a constant voltage power transformer 68 which supplies a closely regulated operating voltage to the full-wave rectifier 70 thereof. The rectifier 70 has a number of filter stages 72, 74 in excess of that customarily provided in radio power supplies, for example, in order to provide a highly filtered direct current voltage for excitation of the strain gages. Any line or power supply variations that pass through the regulated power supply will be of low frequency considerably less than 10 C. P. S., for example, and will be further attenuated in the strain gage amplifier 36, the response of which is designed to drop off for frequencies below 20 C. P. S.

The servo amplifier 40 may be of the type well known in the art, such, for example, as that manufactured by the Brown Instrument Division of the Minneapolis Honeywell Regulator Company. The input of the servo amplifier is included in a balancing or comparison circuit 76 (Fig. 1) which includes the output of the strain gage amplifier and the static signal controller. The output of the servo amplifier is supplied in the form of an alternating control signal to the servomotor 42, which may be a low speed two phase motor of the type commonly used in servo installations and has a reference winding 77 that is energized from a local alternating current supply and a control winding 78 that is connected to the servo amplifier 40. The shaft 80 of the servomotor 42 is mechanically coupled by a suitable linkage and gear drive arrangement 82 to move the adjustable arm 30 of the Variac 20 in the energizing circuit of the exciter motor 16.

A synchronous clock type of counter or timer 84 is connected in the energizing circuit of the exciter motor 16 to count the number of load cycles, and any suitable means, such as a Strobatac (not shown), may be employed to measure the frequency of vibration. The product of the time and frequency will be the number of load cycles the specimen has received to failure.

Briefly treating with the operation of the apparatus which should be apparent from the foregoing, the strain gage devices 32, 34 provide an alternating current signal, the amplitude of which corresponds to the actual stress intensity or dynamic load level in the test specimen. The dynamic level signal is amplified and detected in the strain gage amplifier 36 and is differentially combined in the comparison circuit 76 with the direct current reference signal derived from the static level controller 38.

The differential or error control signal resulting from the comparison of the dynamic or static signals is amplified in the servo amplifier 40 and is then applied to control the motion of the servomotor 42 so as to increase or decrease the load excitation, and thereby to effect a balance between the dynamic load signal and the static reference signal and to return the system to equilibrium.

Since the strain gages 32, 34 are simultaneously subjected to oppositely varying strains, the junction A between the strain gages is subjected to a greater variation in potential than that which would be obtained if only a single strain gage, or a plurality of strain gages that are simultaneously subjected to the same tensile or compressive strain, were employed. The use of two strain gages and the particular manner in which they are mechanically mounted and electrically connected thus cooperate to provide a signal which accurately depicts and follows the changes in the dynamic load level. The manner in which the strain gage signal is combined with a fixed reference signal has been found to provide an entirely practical proportional load controller possessed of sufficient sensitivity to provide an adequate control function over the load and in which load regulation may be held to within less than one percent at normal settings.

Both the static level controller and the strain gage amplifier receive their D. C. excitation from the same power source whereby any changes in the operating voltage will affect the dynamic strain gage signal and the static reference signal in the same direction and thus maintain the same relative value therebetween, thereby further contributing to the overall reliability of the control system.

The controller of Fig. 1 may be further refined by the addition of derivative feed-back in the error signal loop. This may be accomplished as shown in Fig. 2 by driving a small D. C. generator 86 from the servomotor 42 so as to generate a voltage proportional to the angular velocity of the servomotor. The generated voltage will be the first derivative with respect to time of the resultant differential control voltage that is applied to the servomotor. The derivative signal is supplied over conductors 88, 90 which connect the output of the generator in series with the output of the strain gage amplifier 36 and the static level controller 38 and the input of the servo amplifier, all in the comparison circuit. The derivative feed-back voltage from the generator is of opposite polarity to the detected strain gage signal and of similar polarity to the static reference signal and, when adjusted as to amount, injects the proper amount of damping into the system so that operation can always be in the critically damped position as far as the servo loop is concerned regardless of the mechanical damping in the test specimen assembly.

While the present invention has been described in connection with a resonant tuning fork type of machine, the invention may be used for other forms of stress and fatigue test equipment where a strain gage signal is available and a servomotor can be used to control the exciting force to the load specimen.

What is claimed is:

1. A resonant type fatigue testing apparatus comprising, in combination, a pair of spaced arms adapted to be connected together by a test specimen to form a tuning fork, a dynamically unbalanced excitinig motor mounted on one of said arms, a source of electric power for said exciting motor and means for adjusting the voltage supplied therefrom to said motor, at least one of the arms of said tuning fork having a notch therein, strain gage means mounted in said notch and developing a signal representative of the actual stress intensity in said tuning fork, means developing a fixed reference signal, means combining said stress responsive signal and said fixed reference signal and deriving a resultant control signal therefrom, and a servomotor energized from said control signal and operatively connected to said voltage adjusting means for said exciting motor.

2. In resonant type fatigue testing apparatus including a pair of spaced arms adapted to be connected together by a test specimen to form a tuning fork, activating means forcing vibration of said tuning fork, one of the arms of said tuning fork having a pair of oppositely positioned notches in the sides thereof, and strain responsive pick-up means mounted in said notches.

3. In resonant type fatigue testing apparatus including the combination of a pair of spaced arms adapted to be connected together by a test specimen to form a tuning fork, exciting means forcing vibration of said tuning fork, a source of electric power for said exciting means and means for adjusting the voltage supplied therefrom to said exciting means, one of the arms of said tuning fork having a pair of oppositely positioned notches in the sides thereof, strain responsive pick-up means mounted in said notches developing a signal representative of the actual stress intensity in said tuning fork, means developing a fixed reference signal, means combining said actual stress signal and said fixed reference signal and deriving a resultant control signal therefrom, and a servomotor energized from said control signal and operatively connected to said voltage adjusting means for said exciting means.

4. The combination in accordance with claim 1 above including a derivative feedback controller driven from said servomotor and deriving a signal proportional to the time rate of change of said resultant control signal, said derivative feedback controller being connected in circuit with said strain gage means and said reference signal means.

5. In a resonant type fatigue testing apparatus comprising the combination of a pair of arms adapted to be connected together by a test specimen, an exciting motor and an unbalance weight driven thereby mounted on a free end of one of said arms, a source of electric power for said motor and means for adjusting the voltage supplied therefrom to said motor, strain gage means mounted on said tuning fork and developing a signal representative of the actual stress intensity in the tuning fork, means developing a fixed reference signal, means combining said stress responsive signal and said fixed reference signal and deriving a resultant control signal therefrom, and a servomotor energized from said control signal and operatively connected to said voltage adjusting means for said exciting motor.

6. A resonant type fatigue testing system comprising the combination of vibratory means mounting a test specimen thereon, an exciting motor connected to said vibratory means to induce vibrations therein and to subject said specimen to cyclically repeated stresses, a source of electric power for said exciting motor and means for adjusting the voltage supplied therefrom to said motor, strain gage means mounted on said vibratory means and developing a signal representative of the actual stress intensity in said vibratory means, means developing a fixed reference signal, means combining said stress responsive signal and said fixed reference signal and deriving a resultant control signal therefrom, a servomotor energized from said control signal and operatively connected to said voltage adjusting means for said exciting motor, and a derivative feedback controller driven from said servomotor and deriving a signal proportional to the time rate of change of said resultant control signal, said derivative feedback controller being connected in circuit with said strain gage means and said reference signal means.

References Cited in the file of this patent

UNITED STATES PATENTS

| Re. 22,416 | Eksergian | Jan. 11, 1944 |
| 2,316,975 | Ruge | Apr. 20, 1943 |
| 2,496,632 | Lazan | Feb. 7, 1950 |
| 2,500,764 | Macgeorge | Mar. 14, 1950 |
| 2,675,698 | Johnson | Apr. 20, 1954 |

FOREIGN PATENTS

| 677,436 | Germany | June 26, 1939 |